US008340788B2

(12) United States Patent
Sussmeier et al.

(10) Patent No.: US 8,340,788 B2
(45) Date of Patent: Dec. 25, 2012

(54) POSITIONED BASED MOTOR TUNING FOR A GUILLOTINE CUTTER MECHANISM

(75) Inventors: John W. Sussmeier, Cold Spring, NY (US); Arthur H. DePoi, Brookfield, CT (US); Gerald F. Leitz, New Milford, CT (US)

(73) Assignee: Pitney Bowes Inc., Stamford, CT (US)

(*) Notice: Subject to any disclaimer, the term of this patent is extended or adjusted under 35 U.S.C. 154(b) by 1256 days.

(21) Appl. No.: 11/639,588

(22) Filed: Dec. 15, 2006

(65) Prior Publication Data

US 2008/0141838 A1 Jun. 19, 2008

(51) Int. Cl.
*G06F 19/00* (2011.01)

(52) U.S. Cl. ............ 700/37; 700/42; 700/122; 700/127; 700/167; 700/173; 702/182; 318/560; 83/13; 83/29

(58) Field of Classification Search .................... 700/37, 700/42, 122, 127–129, 159, 167, 173; 702/182; 318/560, 861; 83/13, 29
See application file for complete search history.

(56) References Cited

U.S. PATENT DOCUMENTS

| | | | | | |
|---|---|---|---|---|---|
| 5,070,465 | A | * | 12/1991 | Kato et al. | 345/441 |
| 5,121,663 | A | * | 6/1992 | Tahara et al. | 83/42 |
| 5,371,449 | A | * | 12/1994 | Tajima et al. | 318/560 |
| 5,892,345 | A | * | 4/1999 | Olsen | 318/571 |
| 5,910,721 | A | * | 6/1999 | Hayashi et al. | 318/649 |
| 5,936,366 | A | * | 8/1999 | Hamamura et al. | 318/560 |
| 6,037,738 | A | * | 3/2000 | Morita et al. | 318/625 |
| 6,658,370 | B2 | * | 12/2003 | Christ et al. | 702/182 |

* cited by examiner

*Primary Examiner* — Michael D Masinick
(74) *Attorney, Agent, or Firm* — Michael J. Cummings; Charles R. Malandra, Jr.; Steven J. Shapiro

(57) ABSTRACT

A method for tuning operation of servo motors includes selecting a plurality of discrete positions in a guillotine blade cycle for which to determine tuning coefficients, determining tuning coefficients at the discrete positions, interpolating tuning coefficients for positions between the discrete positions, and applying the determined and the interpolated tuning coefficients to the servo motor. The servo motors may be used in connection with a guillotine cutter for separating individual sheets from a continuous web. The guillotine cutter blade may be driven by a servo motor to cyclically lower and raise to transversely cut the web transported below the cutter blade.

7 Claims, 5 Drawing Sheets

POSITIONED BASED MOTOR TUNING FOR A GUILLOTINE CUTTER MECHANISM

FIELD OF THE INVENTION

The present invention relates generally to fine tuning the operation of a high speed guillotine cutter at the input portion of a high speed inserter system. In such a system, individual sheets are cut from a continuous web of printed paper for use in mass-production of mail pieces.

BACKGROUND OF THE INVENTION

Inserter systems, such as those applicable for use with the present invention, are typically used by organizations such as banks, insurance companies and utility companies for producing a large volume of specific mailings where the contents of each mail item are directed to a particular addressee. Also, other organizations, such as direct mailers, use inserts for producing a large volume of generic mailings where the contents of each mail item are substantially identical for each addressee. Examples of such inserter systems are the 8 series, 9 series, and APS™ inserter systems available from Pitney Bowes Inc. of Stamford, Conn.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

At the input end of the inserter system, rolls or stacks of continuous printed documents, called a "web," are fed into the inserter system by a web feeder. The continuous web must be separated into individual document pages. This separation is typically carried out by a web cutter device. In a typical web cutter, a continuous web of material with sprocket holes on both sides of the web is fed from a fanfold stack from web feeder into the web cutter. The web cutter has a tractor with pins or a pair of moving belts with sprockets to move the web toward a guillotine cutting module for cutting the web crosswise into separate sheets. Perforations are provided on each side of the web so that the sprocket hole sections of the web can be removed from the sheets prior to moving the cut sheets to other components of the mailing inserting system. Downstream of the web cutter, documents can be transported to a right angle turn that may be used to reorient the documents, and/or to meet the inserter user's floor space requirements.

In a typical embodiment of a web cutter, the cutter is comprised of a guillotine blade that chops transverse sections of web into individual sheets. This guillotine arrangement requires that the web be stopped during the cutting process. As a result, the web cutter transports the web in a sharp starting and stopping fashion.

In a feed cycle, the paper is advanced past the blade of the guillotine cutter by a distance equal to the length of the cut sheet and is stopped. In a cut cycle, the blade lowers to shear off the sheet of paper, and then withdraws from the paper. As soon as the blade withdraws from the paper path, the next feed cycle begins. The feed and cut cycles are carried out in such an alternate fashion over the entire operation.

In some web cutters, it is desirable to achieve a cutting rate of 25,000 cuts per hour or more, for example. This means that the web cutter has a feed/cut cycle of 144 ms. Typically the length of the cut sheet is 11 inches (27.94 cm). If the time to complete a cut cycle is about 34 ms, then the total time in a feed cycle is 110 ms. This means that the web must be accelerated from a stop position to a predetermined velocity and then decelerated in order to stop again within 110 ms. As guillotine cutters are required to generate pages even faster (up to 36,000 cuts per hour), precise motion control coordinated over various mechanisms must be implemented in order to eliminate web breakage and to reliably cut sheets of proper length at high rates.

In this environment, it is important to be able to precisely control the guillotine cutter to accurately perform its cuts during the brief time window available. Since the guillotine blade servo motor is subject to varying torques throughout the up and down cycle of the guillotine blade, it has been found to be difficult to tune the driving servo motor in order to achieve the exacting performance required.

SUMMARY OF THE INVENTION

For a typical closed loop motion control system with fixed hardware gains and servo update rate, determining servomotor tuning coefficients is a function of inertial and friction loading reflected back to the servo motor. For mechanisms that have inertial and friction loads that are not constant, determination of tuning coefficients that provide satisfactory or optimized motion control performance can be difficult, if not impossible to achieve. One such mechanism that has varying friction and inertial properties reflected to the motor shaft is a crank-rocker mechanism. The crank-rocker mechanism is typically utilized as a means to provide motion to a guillotine cutter blade assembly.

The present invention provides a method for improved tuning of servo motors used to drive guillotine cutters. Rather than providing a single tuning coefficient to the motor, the tuning coefficient is continuously varied during the blade's cutting cycle. The novel method for selecting the varying tuning coefficients allows rapid and precise cutting and minimizes lag or overshooting.

In a first step of the tuning process, a plurality of discrete positions in the blade cycle are selected for analysis of the optimal tuning coefficients at those positions. For each of those discrete positions, tuning coefficients are determined. In one preferred embodiment, the motor is commanded to move through approximately three degrees (of the three hundred sixty blade cycle) at the discrete position. The actual displacement corresponding to the command is observed. The tuning coefficients for that discrete location are then determined by adjusting the coefficients up or down, and repeating the test until the desired motion is achieved. In the preferred embodiment, the step of determining tuning coefficients is done using PID (proportional, integral, derivative) control techniques with a PID controller providing control signals to the motor amplifier.

After the tuning coefficients have been determined for the discrete locations in the blade cycle, the coefficients for the remainder of the blade cycle are determined through interpolation. In a preferred embodiment, linear interpolation is used. The controller then applies the measured and interpolated coefficients to the amplifier that controls the motor.

In the preferred embodiment, the step of selecting the discrete positions includes selecting 90 degrees, 180 degrees, 270 degrees, and 360 degrees in a guillotine blade cycle. These four positions roughly correspond to peaks and valleys in the coefficients needed to work with the varying torques that are required over the blade cycle. The 180 degree position represents a bottom dead center position and 360 degrees represents a top dead center position in the blade cycle. These top and bottom positions also represent points in the cycle with low torque requirements and low tuning coefficients. The horizontal positions of 90 and 270 degrees represent high torque positions that will require peak coefficients.

One of skill in the art will understand that the gearing ratio of the motor to the blade cycle need not be one to one. Thus, more or less than one rotation of the motor can result in one cycle of the blade. The tuning coefficients are based on the blade position, regardless of the gearing ratio between the blade cycle and the motor.

By testing for the proper coefficients at those four discrete quadrant positions, the appropriate bases for linear interpolation are achieved. Interpolation may also be done based on a sinusoidal shaped curve.

Further details of the present invention are provided in the accompanying drawings, detailed description, and claims.

DETAILED DESCRIPTION

Figure 1A:
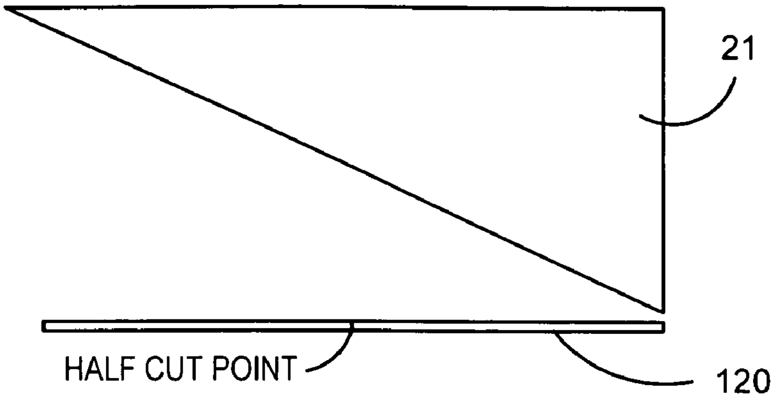
FIGS. 1*a*, 1*b*, and 1*c* depict a view of a guillotine cutter blade cutting across a sheet of web in varying stages.
Figure 1B:
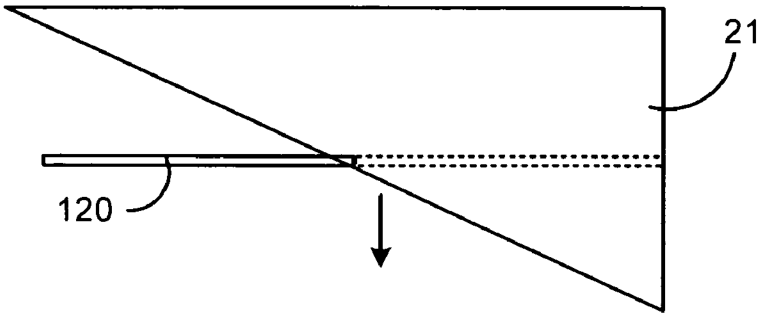
Figure 1C:
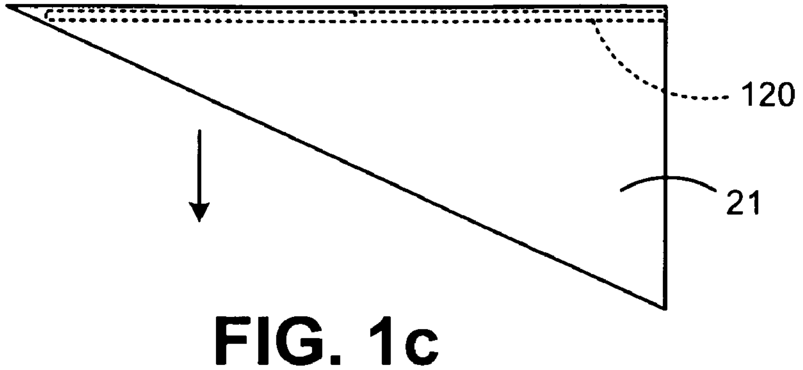

FIGS. 1*a*-1*c* depict the guillotine cutter 21 through a downward cutting motion, starting at a beginning position in 1*a*, to a finished cut position in 1*c*. Guillotine cutter blade 21 preferably has an edge that is vertically inclined at an angle above the path of web 120. As the blade 21 is lowered (FIG. 1*b*) the blade 21 edge comes into contact with the web and cuts across its width (from right to left in FIGS. 1*a*-*c*). In FIG. 1*c*, the blade has reached its bottom position, and the whole width of the web 120 has been cut. In an alternative scenario, blade 21 can be stopped at the position shown in FIG. 1*b*, and only the right half of the web has been cut. This technique is used when the web 120 is comprised of side-by-side sets of sheets, and where only one of the sheets belongs to the mailpiece that is currently being processed. The other half of the web 120 can be cut when the system is ready to start processing the collection of sheets for the next mailpiece.

Figure 2:
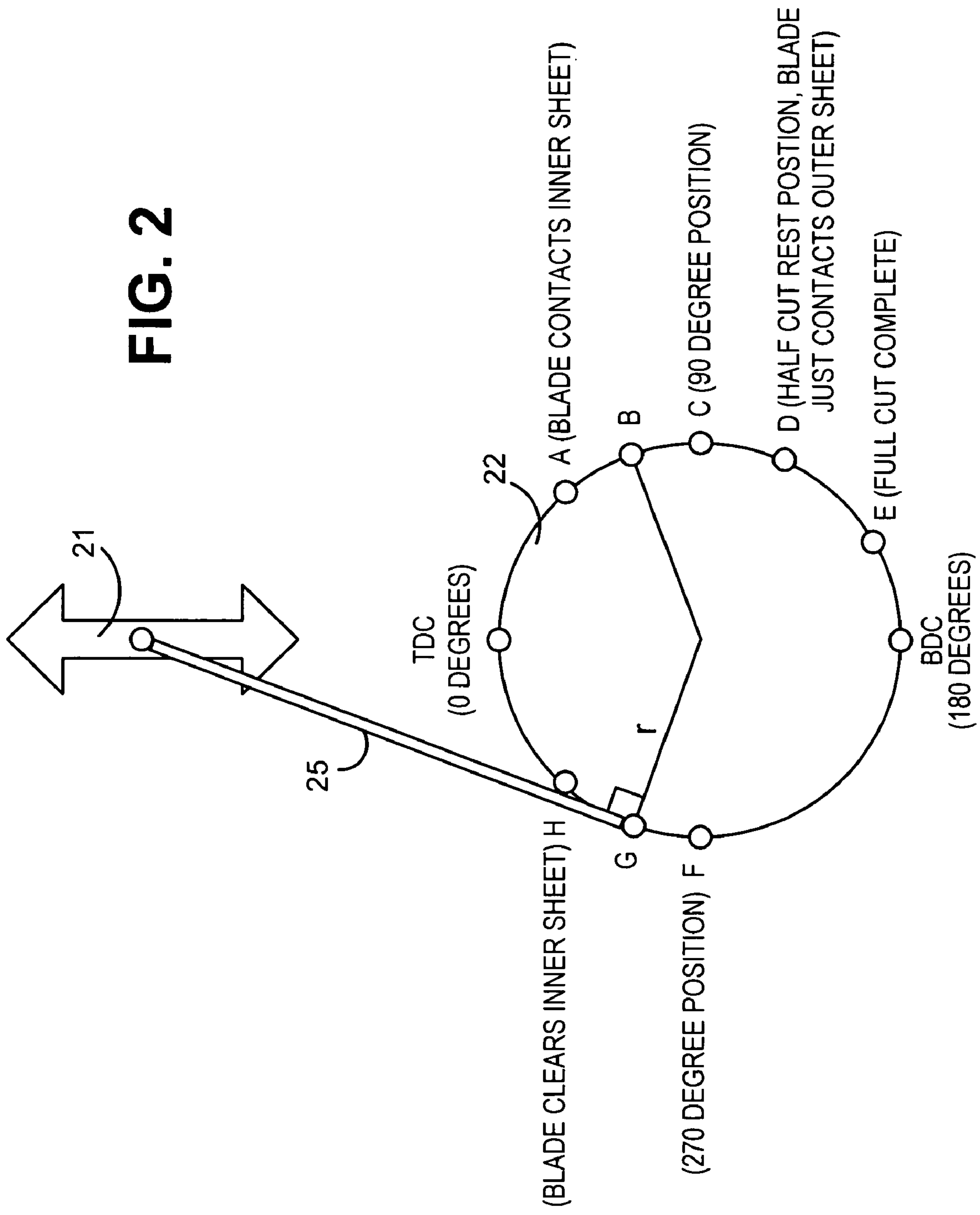
FIG. 2 is a diagrammatic representation of a preferred embodiment of rotary driven cutter blade.

FIG. 2 is a diagram depicting a preferred embodiment for driving the motion of the cutter blade 21. Cutter blade 21 is linked to a rotary motor 22 by an arm 25. As the motor 22 makes a 360 degree rotation in the clockwise direction, the cutter blade 21 undergoes a complete down and up cutting cycle. When the arm 25 is rotated to point TDC, the blade 21 is positioned at top-dead-center above the web 120. When the motor 22 has rotated the arm 25 to position BDC, the blade will be at bottom-dead-center of its cutting cycle.

In this example, TDC and BDC have small moment arms and require lower torques for those positions. Friction is also low on the blade 21 at TDC and BDC, which is a further reason for low torque requirements at those positions. Accordingly, it is expected that motor 22 will require less gain to be driven at those positions.

Positions A-H of the rotary motor 22 in FIG. 2 are other key positions in the cutting cycle. Position A represents the point on the rotation where the blade 21 first comes into contact with the web. Position A in FIG. 2 would roughly correspond to the position of the blade 21 depicted in FIG. 1*a*. Position D in FIG. 2 represents a half-cut position that corresponds to the blade 21 position in FIG. 1*b*. Rotary position E represents the position in the rotary cycle of motor 22 where the web 120 has been completely cut (FIG. 1*c*). The blade 21 completes its downward movement at BDC in the rotary cycle, and rises back up from BDC to TDC. At position H, while rising, the blade 21 rises above the horizontal position of the web 120. The cutter transport resumes transport of the web after point H in the rotary cutting cycle has passed.

Positions C and F have large moments arms, and therefore greater torque requirements on motor 22. At position C, paper is being cut, adding a further frictional component. At position F, the blade 21 is being raised against the force of gravity, and will thus require a larger torque output from the motor 22. Accordingly, it is expected that larger gains will be needed at positions C and F for tuning the control of the motor 22.

Figure 3:
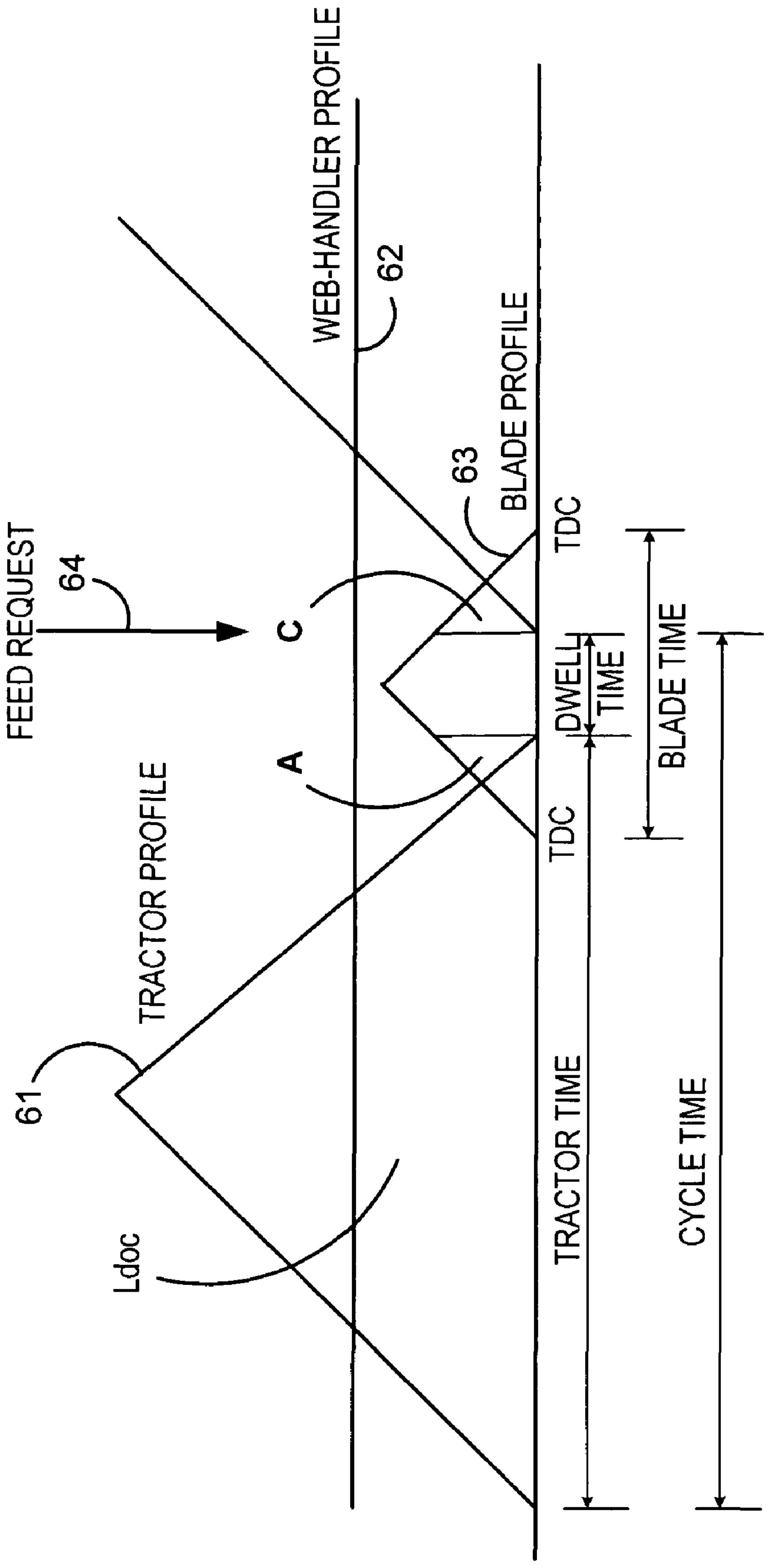
FIG. 3 depicts a graph of preferred motion control profiles for steady state operation of an inserter input module.

FIG. 3 depicts the motion control profiles for the cutter transport 90, the web handler transport, and the rotary motor 22 of cutter 21. This graph shows time on the x-axis and velocity on the y-axis. Cutter transport profile 61 has a triangular shape indicating constant acceleration and deceleration for its controlled motion. In steady state operation web handler profile 62 is preferably a straight line, indicating constant velocity feeding a loop that is expanded and contracted while the cutter transport undergoes the accelerations of profile 61. Blade profile 63 represents the rotary motion of the motor 22 for driving the blade 21. As seen in this preferred embodiment, the blade profile is triangular, indicating constant acceleration during the downward stroke to BDC, and decelerating a constant rate while returning back to TDC.

The blade 21 begins its motion profile 63 when the displacement of the cutter transport is such that, after the blade 21 has reached displacement A, the cutter transport will have come to rest. Blade displacement, A, is the blade position from TDC where the blade just contacts the inner sheet of web 120 minus some amount for margin (includes servo settle time).

Figure 4:
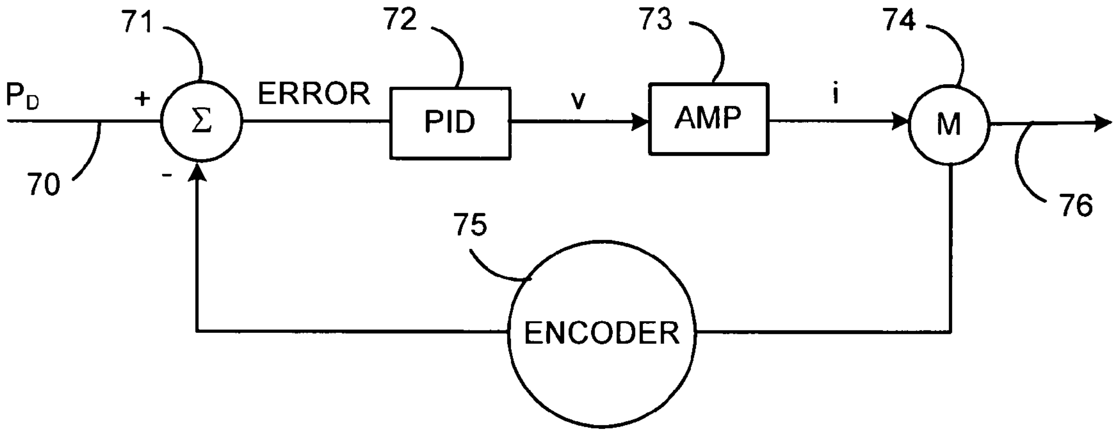
FIG. 4 depicts a feedback control loop for controlling and tuning the guillotine blade servo motor.

The use of closed loop position control systems, as illustrated in FIG. 4, are well known in the motion control industry. At some periodic rate, a motion profile (PD) is injected at point 70 and provides a desired position into a summing junction 71, also referred to herein as a comparator. Actual position is subtracted from the desired position to provide a position error. This error is injected into a digital filter (or controller) 72 that outputs a DAC (digital to analog converter) value. In the industry, a preferred digital filter 22 is commonly known as a PID (Proportional, Integral, Derivative) filter. However, any suitable algorithm that converts position error into a DAC power stage 73 (also referred to as an amplifier or drive) can be used to provide a value to a motor 74 to provide the desired quality of motion at the mechanical load 76.

The DAC value is scaled accordingly to match the inputs and outputs of the power stage or amplifier 73. Such scaling is achieved with a digital filter that contains tuning coefficients. The filter outputs a percentage of the range between maximum and minimum values that can be applied to the amplifier 73. In addition to providing the proper gain for the system, the tuning coefficients are also selected to provide desired position accuracy, desired system response and stability. The tuning coefficients may also be referred to as the "gain" of the system. The tuning coefficients may also be characterized as a sum of a subset of parameters that contribute to system stability. In a PID system, proportional gain, derivative gain, and integral gain are the primary components for determining the overall gain. These, and other less significant tuning parameters, are well known in the art and need not be described in further detail here.

Many commercially available amplifiers 73 use+/−10 VDC as an acceptable analog input signal. The power stage 73 converts this input signal and outputs a winding current that is proportional to the input signal. With new components, the digital filter 72 may output a digital value whereby the power stage 73 can accept this digital value and accomplish the same as the analog version. Winding current is delivered to the motor 74 and is typically proportional to motor 74 output torque. This ultimately provides motion to the mechanism 76. An encoder 75 or other suitable feedback device located on the motor 74 or on the mechanism 76 provides the actual position back to the summing junction 71, completing the closed loop. In an inserter machine application, this entire process typically updates at a period of 500 microseconds (or 2 KHz), ultimately providing the desired quality of motion at the cutter mechanism 75.

In the preferred embodiment, tuning operations are performed at separate positions in the cutter blade 22 cycle. Tuning is preferably performed at TDC (0 or 360 degrees), position C (90 degrees), BDC (180 degrees) and at position F (270 degrees) as depicted in FIG. 2. For each of these discrete positions, the blade is preferably moved through approximately three degrees of the cycle. Thus, at position 70 in FIG. 4 a motion command PD is input requiring a corresponding small displacement. The untuned PID filter 72 multiplies the position error signal by a default gain which is then amplified to produce movement. Motor 74 performance is monitored for instability, overshoot and lag of the actual position relative the commanded position. The operator doing the tuning, can then adjust the tuning coefficient of the PID filter 72 to correct the difference between the observed performance and the desired performance of the motor 74 for driving the blade through that discrete portion of its cycle.

The system is then tested again using the new tuning coefficient, and the resulting operation of motor 74 is observed. One of skill in the art will be familiar with tuning processes for adjusting gains to find an optimal tuning coefficient, and further details need not be included here.

In the preferred embodiment, the tuning coefficients are tested and determined in this way for the four quadrant points of the blade cycle (90, 180, 270, and 360 degrees, also shown as positions C, BDC, F, and TDC in FIG. 2). These four points are at, or are very close to, places where maximum or minimum torques are being required from the motor.

In the preferred embodiment, tuning coefficients for untested points between these tested quadrant points are determined using interpolation. Linear interpolation is appropriate, but curved interpolation algorithms may also be used.

For an example of linear interpolation, lets assume we know the tuning coefficient XTDC for the position TDC and the tuning coefficient XC for the 90 degree position (position C in FIG. 2). The following equation provides the linear interpolation for finding the tuning coefficient, X, for a position, θ, located between θTDC (0 degrees) and θC (90 degrees).

$$X=((XC-XTDC)(\theta-\theta TDC))/(\theta C-\theta TDC)$$

Figure 5A:
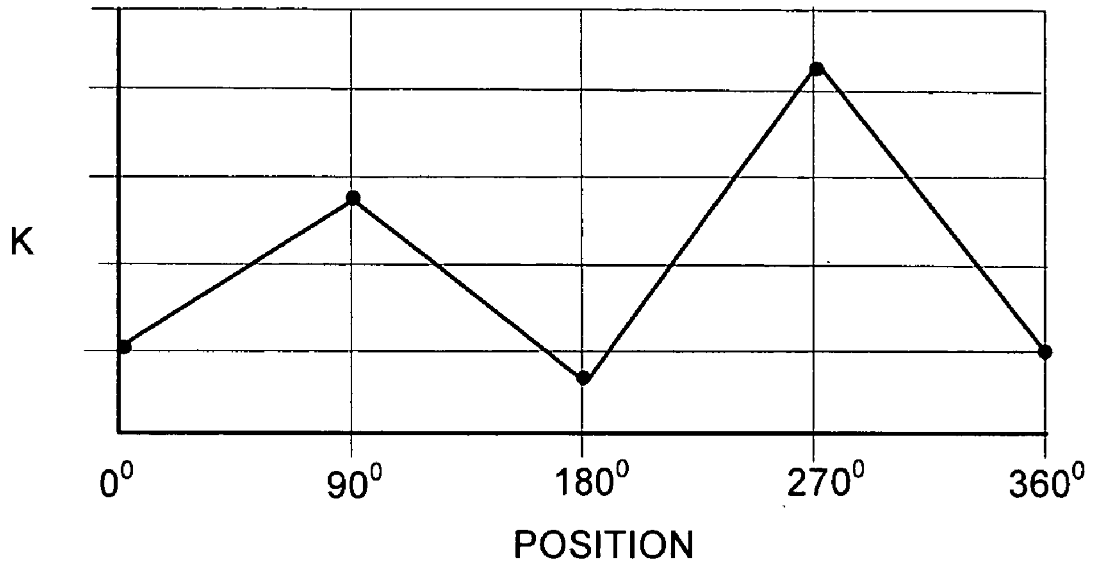
FIGS. 5A and 5B depict ranges of interpolated servo motor tuning coefficients over a blade cycle.
Figure 5B:
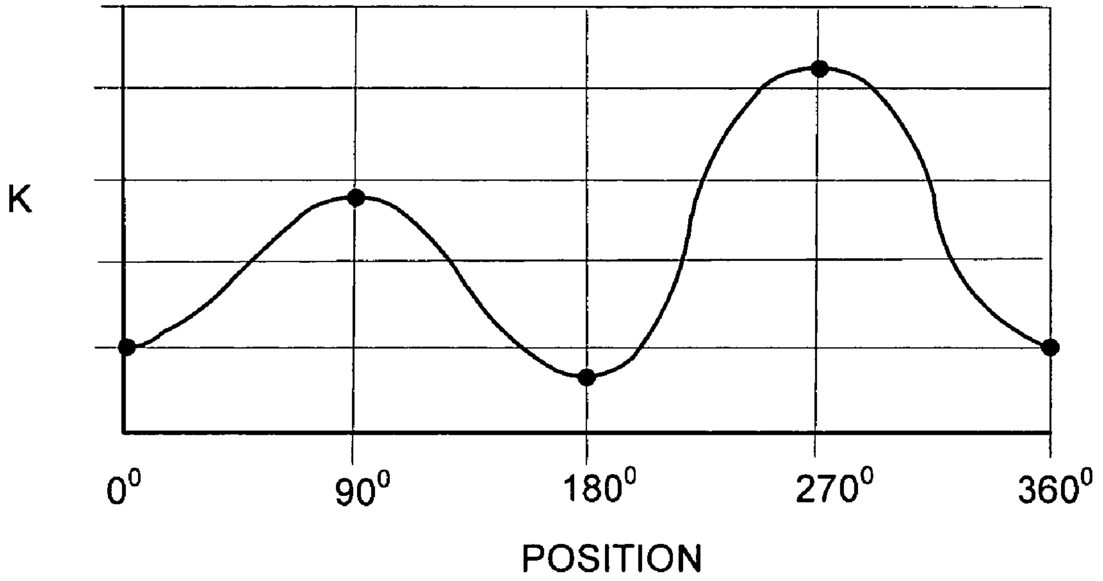

Linear interpolation is an algebraic process that is easily accomplished when the correct parameters are known. FIG. 5A depicts an exemplary graph of tuning coefficients determined for a 360 degree blade cycle, and for which tuning coefficients (K) have been determined by a testing method at the four quadrant positions. The sloped lines between the points represent the tuning coefficients (K) used by PID filter 72 as determined by linear interpolation. The slopes and equations for those lines are easily calculated and the appropriate tuning coefficient is easily determined for points on those lines. FIG. 5B depicts an alternative exemplary embodiment of a graph of tuning coefficients (K) for which a sinusoidal curve has been used between the tested points. The invention is not limited to any particular mathematical method of interpolation, and any shaped curve may be used to interpolate between points.

For interpolation to be useful, it is important that the tested data points reflect the high and low points in the range of proper tuning coefficients. For example, if only TDC and BDC were tested, interpolation would be useless, since none of the higher tuning coefficients needed for the higher torque scenarios at 90 and 270 degrees would be recognized. For the preferred embodiment, that is why the four quadrant points were selected for testing, and for the basis of the interpolation.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for tuning operation of servo motors used in connection with a guillotine cutter for separating individual sheets from a continuous web, the guillotine cutter blade driven by a servo motor to cyclically lower and raise to transversely cut the web transported below the cutter blade, the tuning method comprising:

selecting a plurality of discrete positions in a guillotine blade cycle for which to determine tuning coefficients;

determining tuning coefficients at the discrete positions;

interpolating tuning coefficients for positions between the discrete positions;

applying the determined and the interpolated tuning coefficients to the servo motor;

wherein the step of selecting the discrete positions includes selecting 90 degrees, 180 degrees, 270 degrees, and 360 degrees in the guillotine blade cycle wherein the 180 degree position represents a bottom dead center position and 360 degrees represents a top dead center positions; and wherein the 90 and 270 degree positions represent peak tuning coefficient values.

2. The tuning method of claim 1 wherein the 180 and 360 degree positions represent low tuning coefficient values.

3. The tuning method of claim 2 wherein the 180 degree position represents a lowest tuning coefficient value and the 270 degree position represents a highest tuning coefficient value for the guillotine blade cycle.

4. The tuning method of claim 1 wherein the step of interpolating is done by linear interpolation.

5. The tuning method of claim 1 wherein the step of interpolating is done based on a sinusoidal shaped curve between discrete points.

6. The tuning method of claim 1 wherein the step of determining tuning coefficients is done using PID (proportional, integral, derivative) control techniques.

7. A method for tuning operation of servo motors used in connection with a guillotine cutter for separating individual sheets from a continuous web, the guillotine cutter blade driven by a servo motor to cyclically lower and raise to transversely cut the web transported below the cutter blade, the tuning method comprising:

selecting a plurality of discrete positions in a guillotine blade cycle for which to determine tuning coefficients;

determining tuning coefficients at the discrete positions;

interpolating tuning coefficients for positions between the discrete positions;

applying the determined and the interpolated tuning coefficients to the servo motor;

wherein the step of determining tuning coefficients includes:

providing a position command to the servo motor;

measuring an actual position of the servo motor;

comparing the actual position to a commanded positions; and adjusting the tuning coefficients based on a difference in position determined in the comparing step and wherein the step of providing a position command in the step of determining tuning coefficients further includes moving the cutter blade about three degrees in the cutting cycle, the discrete position being within the three degrees.

* * * * *